(12) United States Patent
Dontcheva et al.

(10) Patent No.: US 8,612,882 B1
(45) Date of Patent: Dec. 17, 2013

(54) METHOD AND APPARATUS FOR CREATING COLLECTIONS USING AUTOMATIC SUGGESTIONS

(75) Inventors: Lubomira Dontcheva, San Francisco, CA (US); Wilmot Wei-Mau Li, San Francisco, CA (US); Adrian Joseph Secord, Brooklyn, NY (US); Holger Winnemoeller, Seattle, WA (US)

(73) Assignees: Adobe Systems Incorporated, San Jose, CA (US); New York University, New York, NY (US)

( * ) Notice: Subject to any disclaimer, the term of this patent is extended or adjusted under 35 U.S.C. 154(b) by 306 days.

(21) Appl. No.: 12/807,778

(22) Filed: Sep. 14, 2010

(51) Int. Cl.
*G06F 3/048* (2013.01)

(52) U.S. Cl.
USPC .......................................................... 715/790

(58) Field of Classification Search
USPC .......................................................... 715/790
See application file for complete search history.

(56) References Cited

U.S. PATENT DOCUMENTS

| 7,644,371 | B2* | 1/2010 | Robertson et al. ............ 715/810 |
| 8,161,411 | B2* | 4/2012 | Robbin et al. ................ 715/854 |
| 2008/0195664 | A1* | 8/2008 | Maharajh et al. ........... 707/104.1 |
| 2009/0006543 | A1* | 1/2009 | Smit ............................... 709/203 |
| 2009/0106202 | A1* | 4/2009 | Mizrahi ............................ 707/3 |
| 2009/0228439 | A1* | 9/2009 | Manolescu et al. ................ 707/3 |
| 2009/0325602 | A1* | 12/2009 | Higgins et al. .............. 455/456.2 |
| 2010/0049702 | A1* | 2/2010 | Martinez et al. ................... 707/4 |
| 2010/0070448 | A1* | 3/2010 | Omoigui .......................... 706/47 |

OTHER PUBLICATIONS

"Creating Collections with Automatic Suggestions and Example-Based Refinement", User Interface Laboratory and Université de XYZ, 10 pages, no date.

* cited by examiner

*Primary Examiner* — Stephen Hong
*Assistant Examiner* — James G Pohlman
(74) *Attorney, Agent, or Firm* — Moser Taboada

(57) ABSTRACT

Method and apparatus for creating collections with automatic suggestions is disclosed. In one embodiment, a method comprises receiving a user specification containing at least one unquantified constraint defining particular items contained in a library, where the library comprises a plurality of items and metadata associated with each item in the plurality of items; parsing and translating the at least one unquantified constraint into at least one quantified constraint to define at least one item of the plurality of items in the library; creating a suggested collection comprising at least one suggested item selected from the library having metadata conforming to at least one quantified constraint; and refining the suggested collection to form a final collection.

20 Claims, 17 Drawing Sheets

FIG. 10 (1000)

| # | label | Song | Album | Artist | Genre |
|---|---|---|---|---|---|
| 12 | "some rock" | Time to Move On | Wildflowers | Tom Petty | Rock |
| 13 | "some rock" | Alpha Beta Parking Lot | Prolonging the Magic | Cake | Rock |
| 14 | "some rock" | To Find A Friend | Wildflowers | Tom Petty | Rock |
| 15 | "some rock" | The Distance | Fashion Nugget | Cake | Rock |
| 16 | "some rock" | Here Comes My Girl | Damn the Torpedoes | Tom Petty & The Heartbreakers | Rock |
| 17 | "some rock" | Plans | Silent Alarm | Bloc Party | Rock |
| 18 | "some rock" | Like Eating Glass | Silent Alarm | Bloc Party | Rock |
| 19 |  | Little Digger | | Liz Phair | Rock |

| Song | Artist | Album | Genre |
|---|---|---|---|
| NYC's Like a Graveyard | The Moldy Peaches | Moldy Peaches | Alternative |
| On Top | The Moldy Peaches | Moldy Peaches | Alternative |
| Steak for Chicken | The Moldy Peaches | Moldy Peaches | Alternative |
| These Burgers | The Moldy Peaches | Moldy Peaches | Alternative |
| What Went Wrong | The Moldy Peaches | Moldy Peaches | Alternative |
| Who's Got the Crack | The Moldy Peaches | Moldy Peaches | Alternative |
| Brand New Colony | The Postal Service | Give Up | Alternative |
| Clark Gable | The Postal Service | Give Up | Alternative |
| Natural Anthem | The Postal Service | Give Up | Alternative |
| Nothing Better | The Postal Service | Give Up | Alternative |
| Recycled Air | The Postal Service | Give Up | Alternative |
| Sleeping In | The Postal Service | Give Up | Alternative |
| Such Great Heights | The Postal Service | Give Up | Alternative |
|  |  |  |  |
| 8 | Motorway To Roseville | Pixies | Trompe Le Mo | Alternative |
| 5 | Myzomatosis (Judge) | Radiohead | Hail To The Th | Alternative |
| 11 | One More Hour | Sleater-Kinney | Dig Me Out | Alternative |
| 4 | "a few Cla | Concerto grosso in B | The English Conc | Corelli: 12 Con | Classical |
| 10 | Brand New Colony | The Postal Service | Give Up | Alternative |
| 1 | Window | They Might Be Gi | John Henry | Alternative |
| 13 | Down There By The | Tom Waits | Orphans: Braw | Alternative |
| 6 | Please Call Me, Babe | Tom Waits | The Heart of S | Alternative |

1202, 1204, 1206

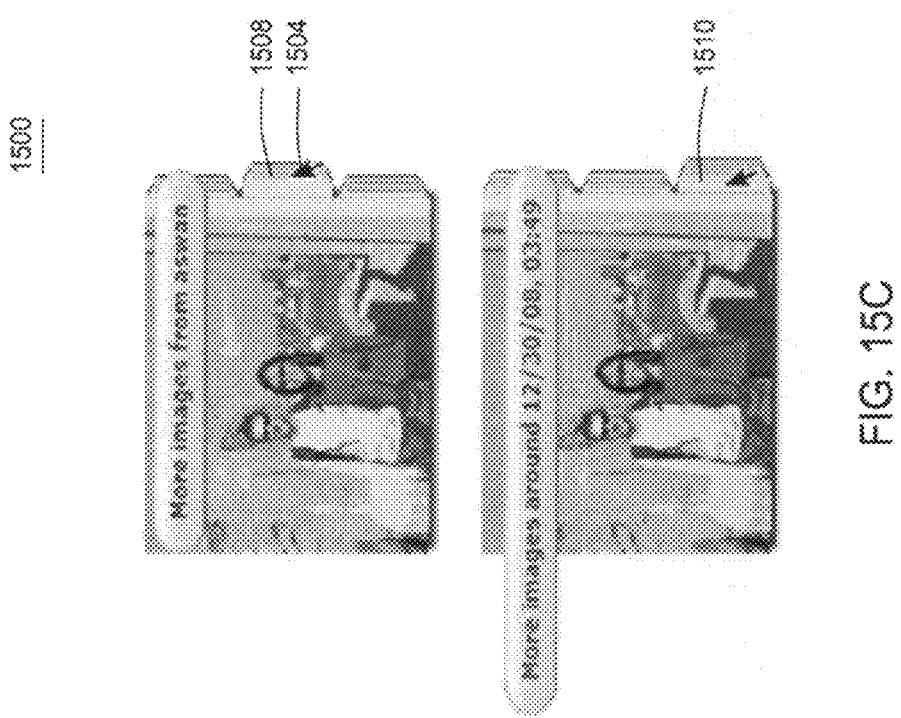

METHOD AND APPARATUS FOR CREATING COLLECTIONS USING AUTOMATIC SUGGESTIONS

BACKGROUND

1. Field

Embodiments of the present invention generally relate to creating collections of items extracted from a library and, more particularly, to a method and apparatus for creating collections using automatic suggestions.

2. Description of the Related Art

Personal media libraries are an important part of daily life, as users collect music, photographs, videos and the like (collectively referred to as "items"). One common task performed by users involves creating smaller collections from a library of items. Conventional techniques for creating collections, such as music playlists from personal media libraries involve either manually selecting items one-by-one or using an example-based recommendation system to automatically generate a collection. These conventional techniques offer either (1) a tedious manual process or (2) a regimented automated process with too little control over how items are selected.

Manually created collections require filtering by strict, individualized search criteria, followed by manually selecting each item for the collection, e.g., a drag-and-drop process. Alternatively, automatic solutions are typically either a fully random selection from a library or example-based, where a collection is automatically selected from a library based on the metadata associated with one or more example items provided by the user. Using either automated technique, the user has little control over the final collection, as the user can only provide examples and cannot express their goals or other, non-metadata related criteria for the content of the final collection.

Therefore, there is a need in the art for a method and apparatus that creates collections by combining automatic suggestions based upon user-defined specifications for the collections with techniques enabling users to refine collections based on example items.

SUMMARY

Embodiments described herein generally include a method and apparatus for creating collections using automatic suggestions. In one embodiment, the method of creating collections using automatic suggestions comprises receiving a user specification containing at least one unquantified constraints defining particular items contained in a library of items, where the library comprises a plurality of items and metadata associated with each item in the plurality of items; parsing and translating the at least one unquantified constraint into at least one quantified constraint to define at least one item to be included in a collection formed as a subset of the plurality of items in the library; creating a suggested collection comprising at least one suggested item selected from the library having metadata conforming to at least one quantified constraint; and refining the suggested collection to form a final collection.

BRIEF DESCRIPTION OF THE DRAWINGS

FIG. 10 is a screen display of an exemplary embodiment of the replacement selector screen, according to one or more embodiments;

FIG. 12 is screen display illustrating an exemplary embodiment of the library browsing refinement feature, according to one or more embodiments;

FIGS. 15a, 15b and 15c are screen displays illustrating three exemplary embodiments of the suggestion widget for refining a collection of two-dimensional items, according to one or more embodiments;

Figure 1:
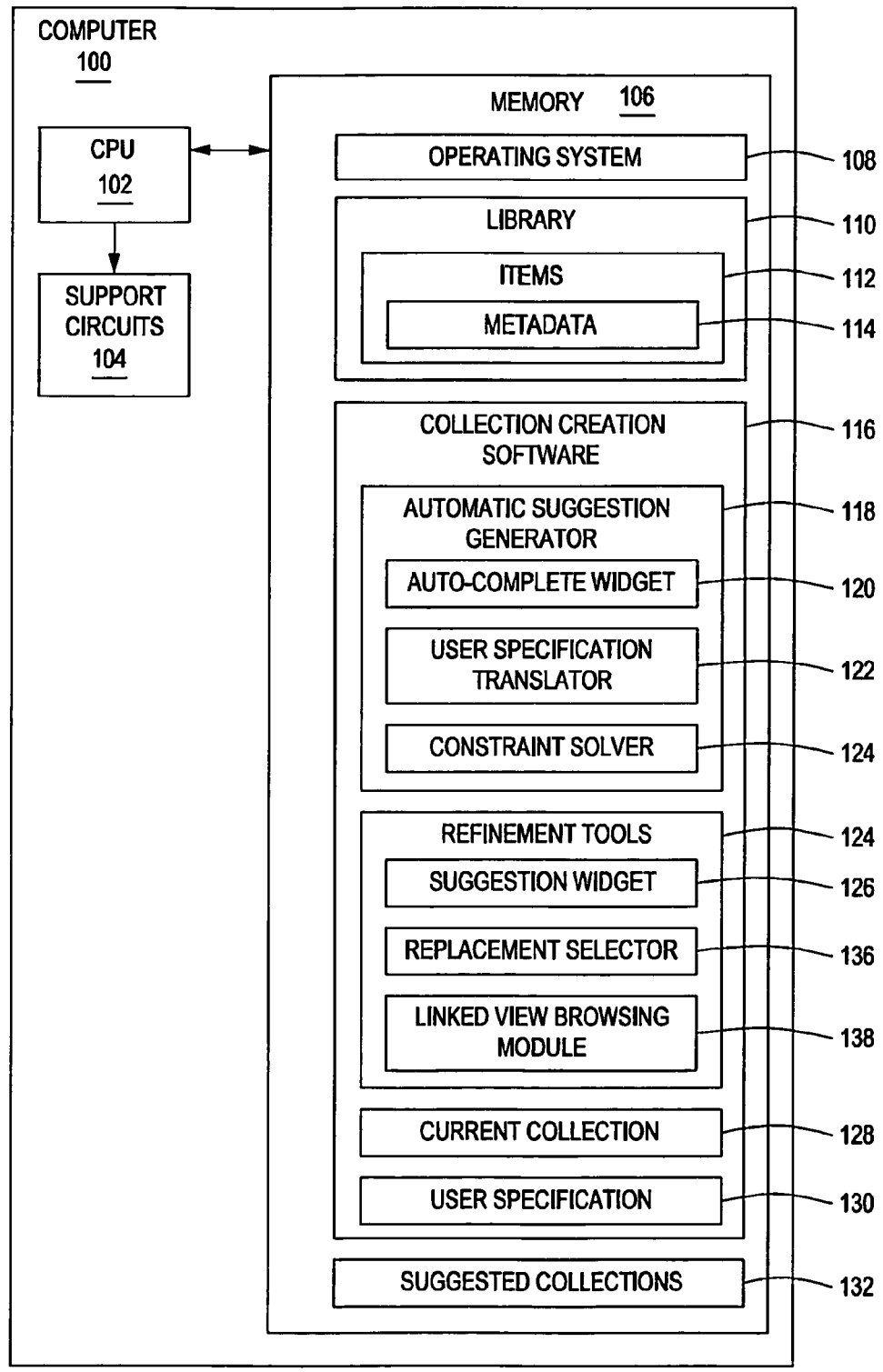
FIG. 1 is a block diagram of a computer used to implement various embodiments of the invention.

While the method and apparatus for creating collections with automatic suggestions is described herein by way of example for several embodiments and illustrative drawings, those skilled in the art will recognize that the system and method for creating collections using automatic suggestions is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for creating collections using automatic suggestions as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for creating collections using automatic suggestions are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 16:
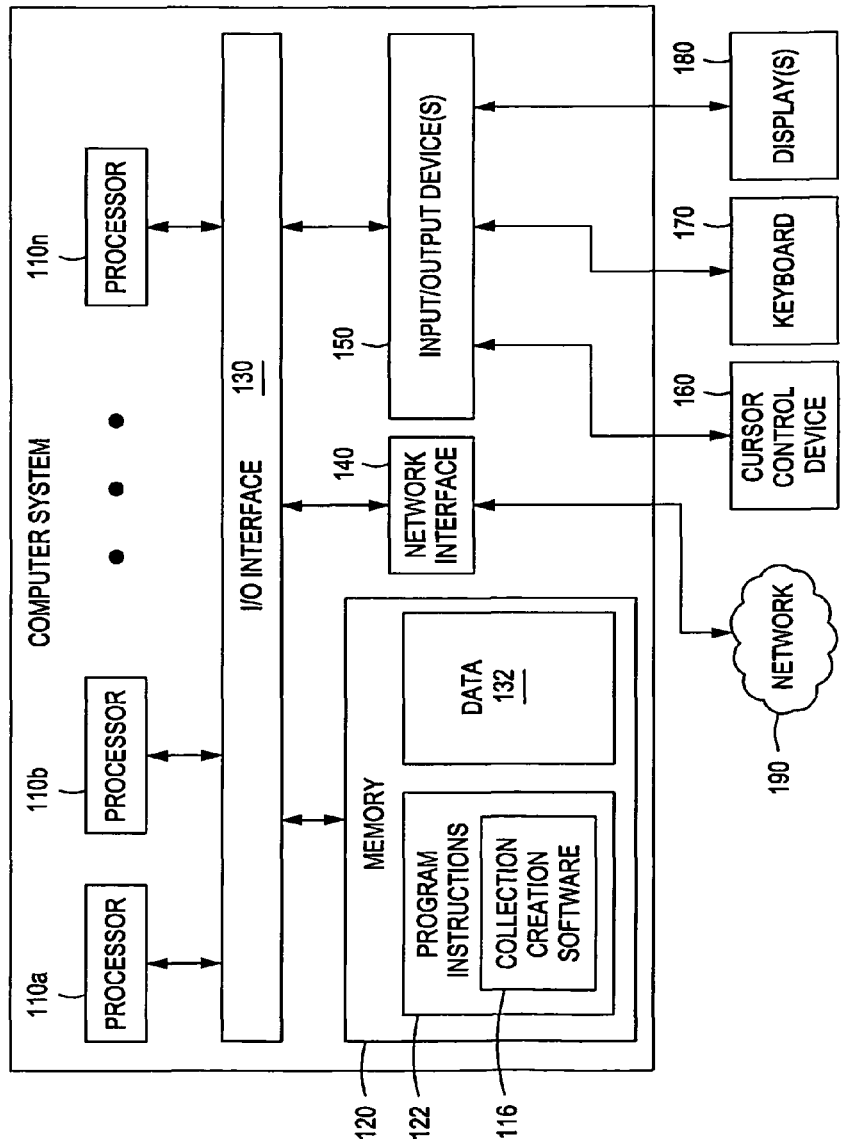
FIG. 16 is a block diagram of a computer system used to implement one or more embodiments.

FIG. 1 is a simplified block diagram of a computer 100 for creating collections using automatic suggestions according to one embodiment of the invention. Additionally, more specific details of a computer system that may be used to implement embodiments of the invention are described below with respect to FIG. 16. The computer 100 is a type of computing device (e.g., a laptop, a desktop, a Personal Digital Assistant (PDA) and/or the like) known to one of ordinary skill in the art having the benefit of this disclosure. The computer comprises the Central Processing Unit (CPU) 102, various support circuits 104 and a memory 106. The CPU 102 may comprise one or more commercially available microprocessors or microcontrollers that facilitate data processing and storage. Various support circuits 104 facilitate operation of the CPU 102 and may include clock circuits, buses, power supplies, input/output circuits and/or the like. The memory 106 includes a read-only memory, random access memory, disk drive storage, optical storage, removable storage, and the like. The memory 106 includes an operating system 108 as well as various software packages, such as collection creation software 116. The collection creation software 116 comprises an automatic suggestion generator 118, refinement tools 124, a current collection file 128, and a user specification 130 comprised of user input query terms. The automatic suggestion generator 118 comprises an auto-complete widget 120, a user specification translator 122, and a constraint solver 134. The refinement tools 124 comprise a suggestion widget 126, a replacement selector 136, and a linked-view browsing module 138. The memory 106 comprises various data, such as a library 110 and suggested collections 132. The library 110 comprises a plurality of items 112 and metadata 114 associated with each item 112.

The operating system 108 generally manages various computer resources (e.g. network resources, data storage resources, file system resources and/or the like). The operating system 108 is configured to execute operations on one or more hardware and/or software devices, such as Network Interface Cards (NICs), hard disks, virtualization layers, firewalls and/or the like. For example the various software packages call commands associated with the operating system 108 (i.e., native operating system commands) to perform various file system and/or storage operations, such as creating files or metadata, writing data to files, reading data from files, modifying metadata associated with the files and/or the like. The operating system 108 may call one or more functions associated with device drivers to execute various file system and/or storage operations.

The collection creation software 116 includes software code (e.g., processor-executable instructions) that is configured to process the user specifications 130 as the user inputs query terms. The collection creation software 116 uses the automatic suggestion generator 118 to parse the user input after every keystroke. The generator 118 recognizes phrases, provides information about items 112 in the library 110 and populates the auto-complete widget 120 with the results. In one specific embodiment, where the library is a music library, the generator 118 recognizes metadata such as song names, artists, albums, and genres. The generator 118 returns a list of suggestions accompanied by the number of available items 112 next to each auto-complete item. Additional query terms may be added to the user specifications 130 by browsing the library 110 and selecting an item 112 or a class of items 112 from the library 110.

The collection creation software 116 includes software code (e.g. processor-executable instructions) that is configured to process the user specifications 130. The user specification translator 122 converts the user specifications into quantified constraints. The collection creation software 116 evaluates the complexity of the constraints and may communicate them to the constraint solver 134 before creating a collection from the library 110. The collection creation software 116 displays the suggested collection and a copy is stored in the suggested collection file 132.

According to one or more embodiments, the collection creation software 116 may execute refinement tools 124 enabling the user to manipulate a current collection 128 such that the user may perform one or more refinements on the current collection 128 to create a suggested collection 132. The refinement tools 124 comprise a suggestion widget 126, a replacement selector 136 and a linked view browsing module 138. The refinement tools 124 are described in detail with respect to FIGS. 5-12 below. Once the user has performed the refinements, the collection creation software 116 stores the suggested collection 128 (now forming a final collection) reflecting the refinements.

Figure 2:
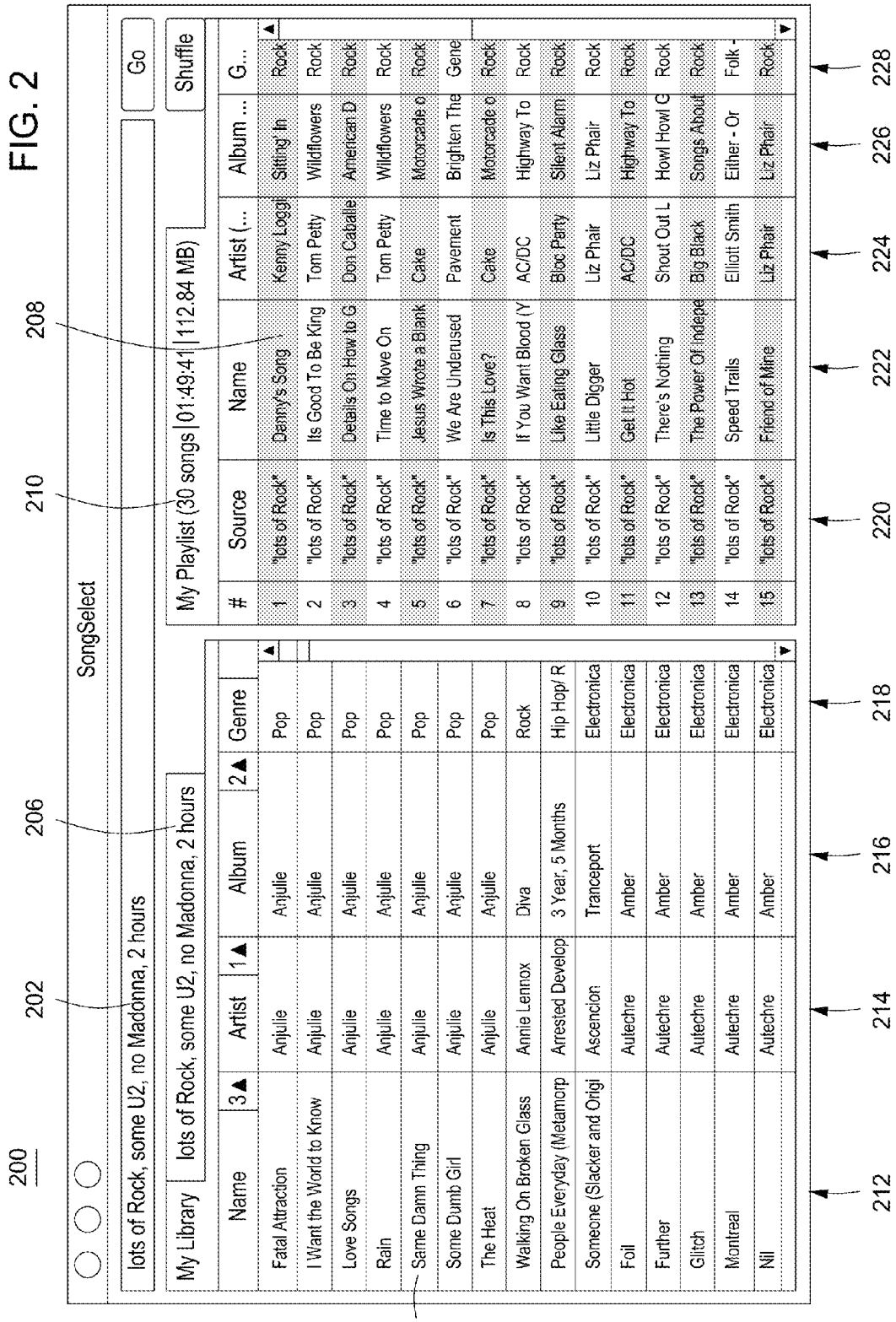
FIG. 2 illustrates a display screen containing a display of a two-paned user interface with an auto-complete text box, according to one or more embodiments.

FIG. 2 illustrates a screen display of a user interface 200 according to one or more embodiments. The user interface 200 is designed to provide a query input area as well as direct feedback to the user regarding the collection that is being assembled. The user interface 200 for query entry comprises an auto-complete text box 202 and two tabbed panes, one for the library display pane 204 and the other for the current suggested collection display pane 208. The library display pane 204 contains the complete library of items, e.g., a song library such as an iTunes library. Each item in the library is identified by metadata, e.g., name, artist, album, genre, and the like. The metadata are organized as columns e.g. columns 212, 214, 216, 218. More or less columns as well as different columns may be used depending on user preferences and type of items in the library.

The library may be organized into pre-sorted lists (e.g., playlists of music) such that tabs 206 may display various lists under distinct tabs. By selecting a tab, the query entered in box 202 is applied to the content of the list (in essence, a prior defined collection) to create the suggested collection. Thus, using such tabs, the resulting suggested collection is drawn from the prior defined collection to limit the search space to a space that is less than the entire library.

Similar to the library display pane 204, the current suggested collection display pane 208 is organized into metadata related columns, e.g., columns 222, 224, 226, and 228 representing music metadata: name, artist, album and genre.

The tab 210 located at the top of the current suggested collection display pane 208 displays a number of items, size and duration of the current collection. In one or more embodiments, a "Source" column in the current collection display pane 208 is populated with information identifying the constraint from the query that is responsible for placing that item in the collection.

Through the interface 200, as controlled by the methods described below, a user may select a library, have the source library displayed in pane 204, enter a common language query into box 202, and have a suggested collection fulfilling the query appear in pane 208. Thereafter, as further described below, the user may refine the suggested collection using various refinement techniques to ultimately create a final collection. The embodiment shown in FIG. 2 defines a collection of music from a music library. As shall be described further below, the organizational concepts of the embodiment of FIG. 2 can be applied to organizing collections of any form of item—including multi-dimensional items such as photographs and video clips.

Figure 3:
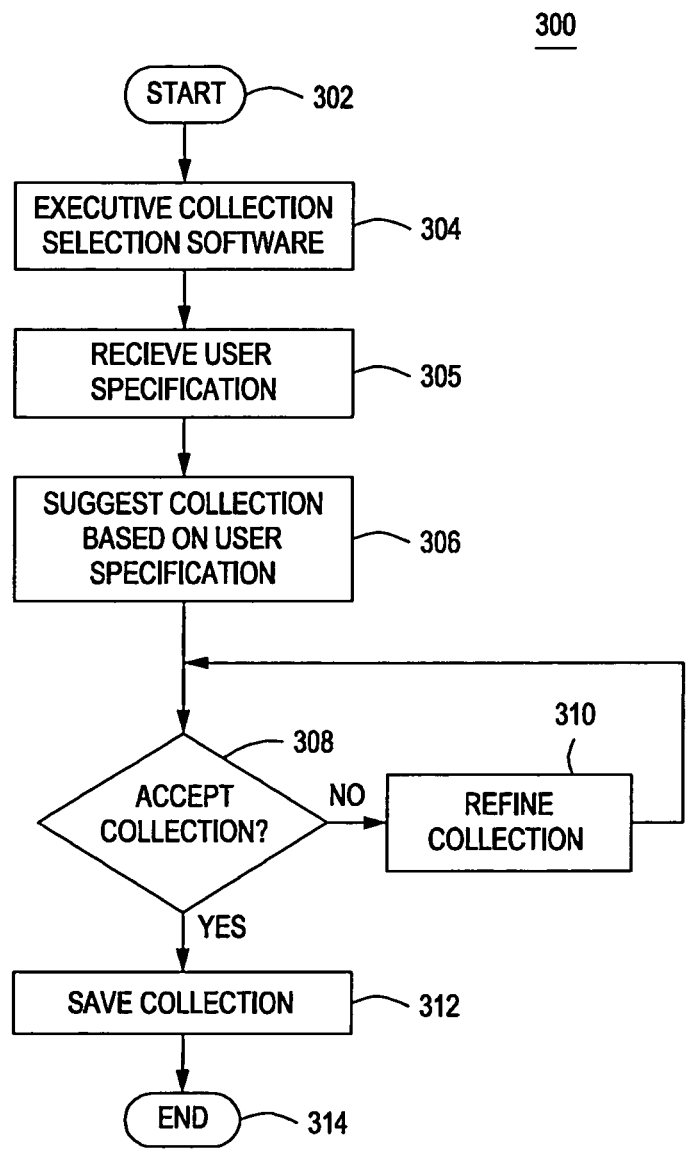
FIG. 3 is a flow diagram of a method for creating and refining collections, according to one or more embodiments.

FIG. 3 depicts a high-level flow diagram of a method 300 of creating and refining collections according to one or more embodiments. The method 300 starts at step 302 and proceeds through to step 314.

At step 302, the collection creation software 116 is executed and the library display pane 204 is populated with all items 112 contained in the library 110. At step 305, the method 300 receives a user specification 130 for a collection, i.e., a query is entered into the box 202 of FIG. 2 and the method 300 receives the query. The method 300 proceeds to step 306 where a suggested collection 132 is created based on the user specifications 130. The details of one embodiment of a suggested collection creation method are described with respect to FIG. 4 below. At step 308, the user may accept the collection as suggested or choose to make refinements. If the user accepts the suggested collection 132, the method 300 proceeds to step 312. On the other hand, if the user desires to refine the collection, method 300 executes one or more refinement tools 124 and proceeds to step 310. Step 310 may be repeated until the user completes the refinements and accepts the collection. The details of one embodiment of a refinement method are described with respect to FIGS. 5-11 below. Once refinements are completed, the method 300 proceeds to step 312 where the current collection 128 is saved into memory as a final suggested collection (collections 132). The method 300 then proceeds to step 314 and ends.

Figure 4:
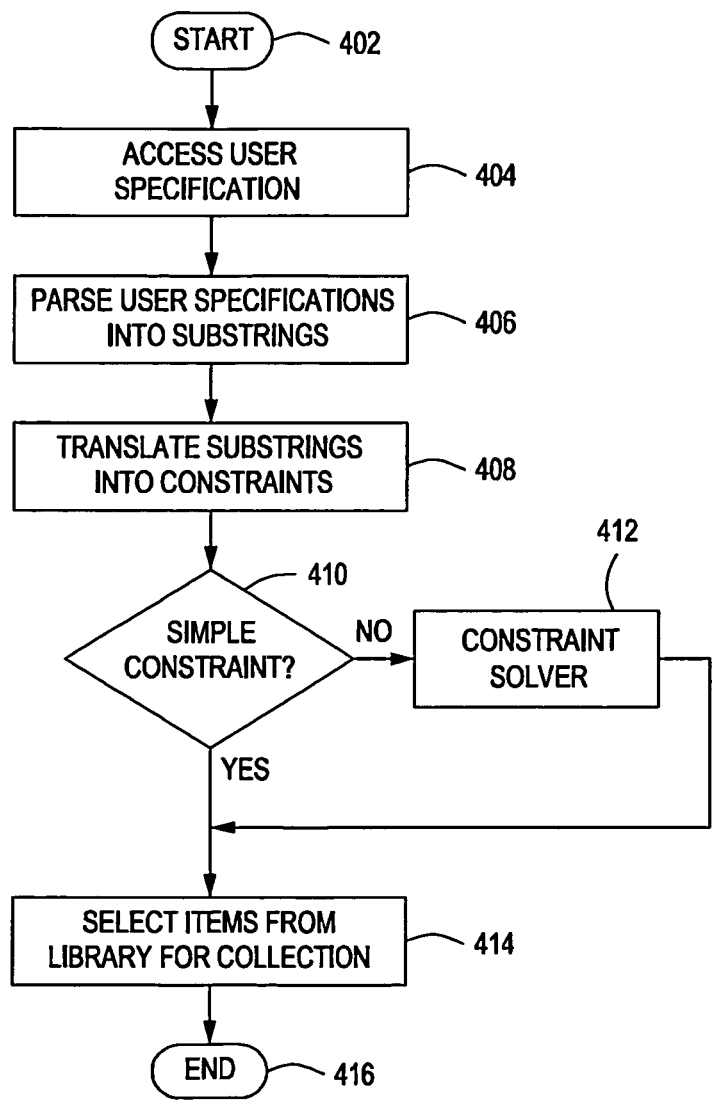
FIG. 4 is a flow diagram of a method for generating a suggested collection based on a user specification, according to one or more embodiments.

FIG. 4 depicts a flow diagram of method 400 of creating the suggested collection 132 based on the user specification 130 according to one or more embodiments. The method 400 starts at step 402 and proceeds through to step 416.

At step 404, the user specification 130 is accessed from the user query entered into the auto-complete text box 202. The method 400 proceeds to step 406 where the user specification 130 is parsed into substrings. Each substring comprises an item or class of items and may contain a modifier. For example, in one specific embodiment, where the library is a music library, the user specification may be a string of natural language terms containing unquantified constraints: "U2, lots of Jazz, a few Rolling Stones, no Madonna". When no modifier is specified by the user, the substring is automatically assigned the "some" modifier. The user specification in the current example would be parsed into four substrings: "some U2", "lots of Jazz", "a few Rolling Stones", and "no Madonna". A modifier such as "1 hour" or "15 songs" would be applied to the entire collection. If no size or length constraint is specified, the collection will default to a predefined number of items (e.g., 20).

The method 400 then proceeds to step 408 where the substrings of unquantified constraints are translated into quantified constraints, assigning percentages to the modifiers. The following is an exemplary table of quantifiers and their translations, according to one or more embodiments.

| Quantifier | Proportion |
| --- | --- |
| "all," "everything," "every," | 100% |
| "most," "mostly," "most" | 75% |
| "lots," "lots of/from/at," | 50% |
| "some," "some of/from/at," | 25% |
| "few," "a few," "a little" | 10% |
| "couple," "a couple," | 2 items |
| "one," "one of/from/at," | 1 item |
| "none," "nothing of/from/at, | 0 items |

In the present example, the substring "some U2" would translate into "25% U2", "lots of Jazz" would translate into "50% Jazz", and "a few Rolling Stones" would translate into "10% Rolling Stones". The proportions are then normalized such that the percentage totals 100%. If there are not enough items of each user-specified class in the library to meet the specified time/size constraints for the collection (e.g., 20 items), the system will randomly select items from the library to meet the time/size constraints. These randomly selected items will still be in accordance to any exclusion constraints, such as "no Madonna" in the present example.

The method 400 then proceeds to step 410 where the quantified constraints are evaluated. If there are multiple or overlapping constraints, such as, "50% Rock, 10% Rolling Stones", i.e., the second constraint is in the class (genre) of the first constraint, the method 400 proceeds to step 412 where the constraint solver 134 calculates the proper constraints in accordance with the user specification. For example, the constraint solver may select 10% of the collection as Rolling Stones music, then add another 40% as randomly selected Rock, but exclude any additional Rolling Stones. In general, the constraint resolver is called from the method 400 to apply specific, predefined constraint rules to otherwise unresolvable or ambiguous queries.

The method 400 then proceeds to step 414. However, if a constraint is a simple, single-phrased constraint, such as "50% Rock" or "0 Madonna", the method 400 proceeds directly from the query of step 410 to step 414. At step 414, the method 400 compares the metadata of library items to the translated constraints. The matching items are selected as the suggested collection 132. The suggested collection is displayed in the suggested collection display pane 208 of FIG. 2. The method 400 then proceeds to step 416 and ends.

Figure 5:
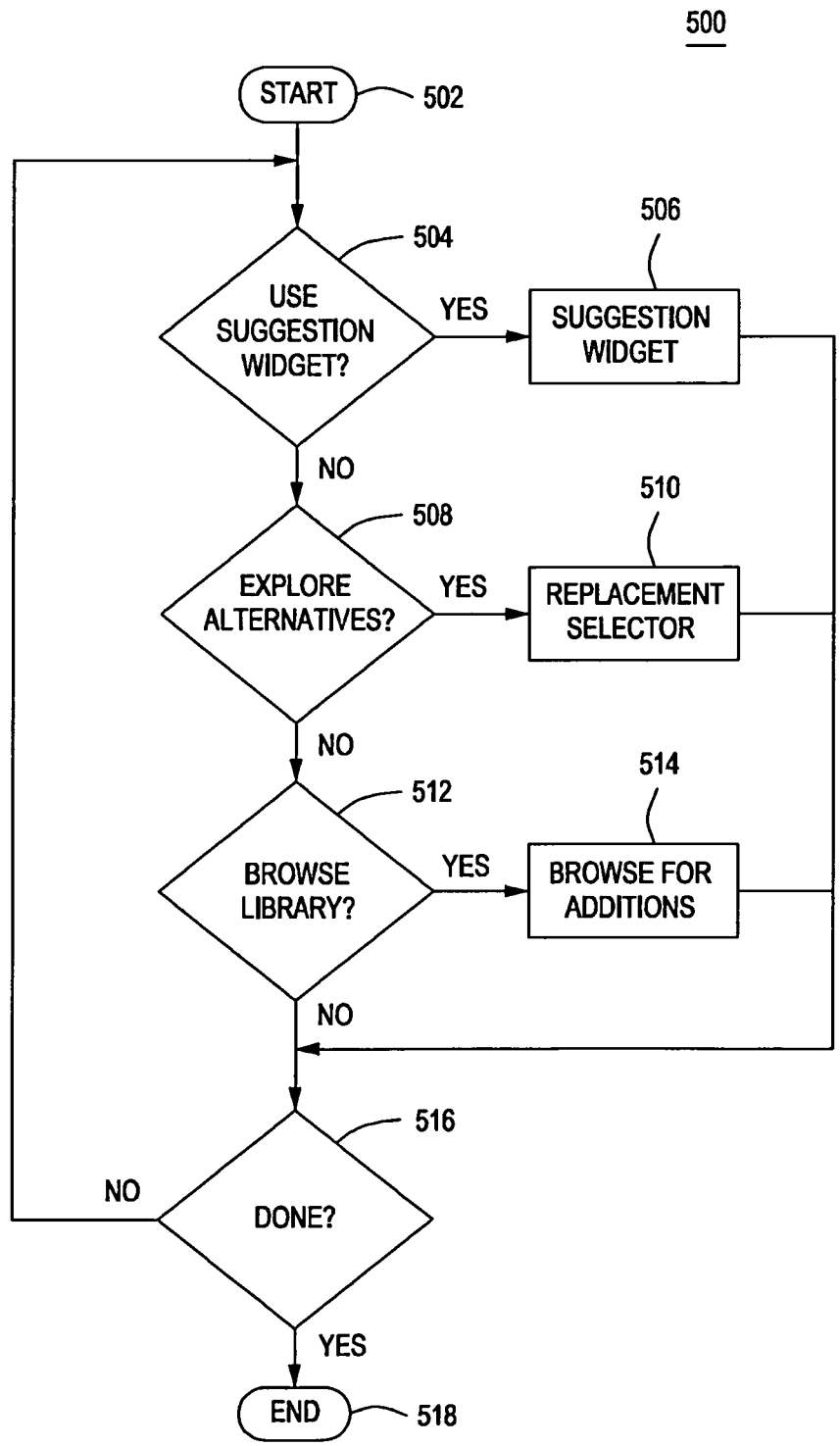
FIG. 5 is a flow diagram of a method of refining the current collection, according to one or more embodiments.

FIG. 5 depicts a flow diagram of method 500 of refining the suggested collection 132 according to one or more embodiments. The method 500 starts at step 502 and proceeds through to step 518. The method 500 is representative of a set of collection refinement tools that may be individually performed or collectively performed. They may also be performed in any order as optionally selected by a user via a menu.

Figure 6:
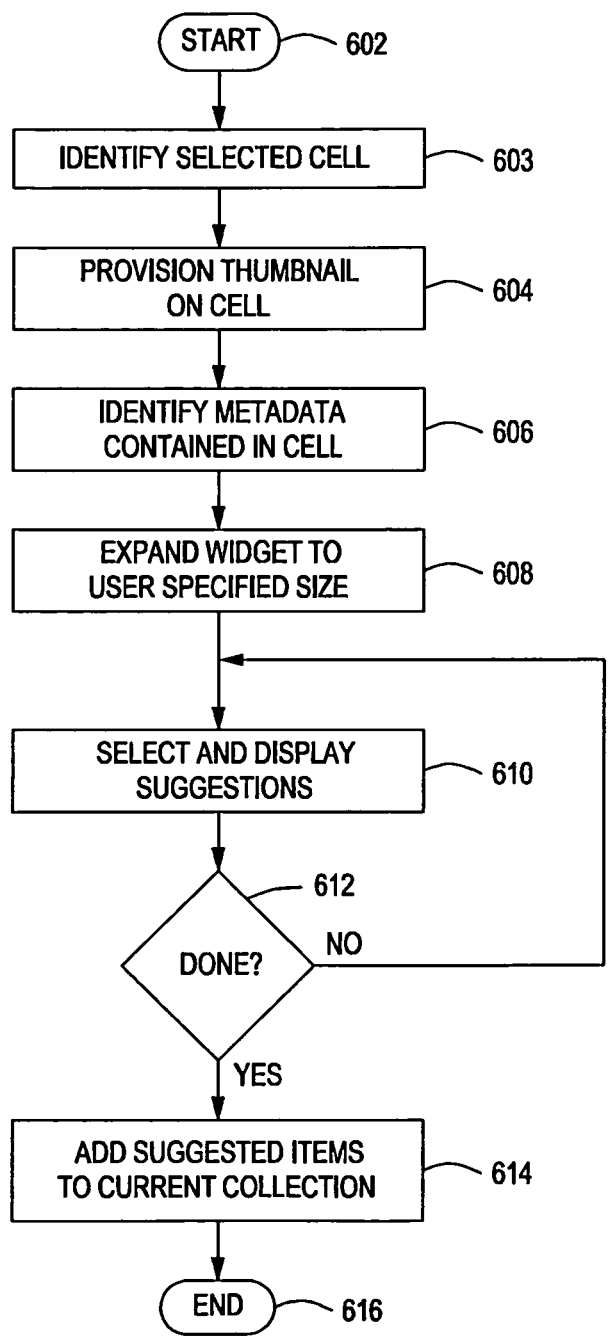
FIG. 6 is a flow diagram of a suggestion widget, according to one or more embodiments.

Optionally, at step 504, the user may choose to add items to the current collection 128 using the suggestion widget 126 (an implementation of which is described with respect to FIG. 6). If the suggestion widget is selected, the method 500 proceeds from the query at step 504 to step 506. Optionally, at step 508, the user may choose to replace items in the current collection 128 at which time, method 500 would proceed from the query at step 508 to step 510. An implementation of the replacement selector 136 of step 510 is described with respect to FIG. 9 below. Optionally, at step 512, the user may choose to browse the library using the linked-view browsing module 138 in order to selectively add items to the current collection 128 at which time method 500 would proceed from step 512 to step 514. One implementation of a method of linked-view browsing for additions is described with respect to FIG. 11 below. Once the optional refinement steps are complete, the method 500 queries, at step 516, whether the user has completed refining the collection. If not, the refinement steps may be repeated, as desired. When the user has finished refining the collection, the method 500 proceeds to step 518 and ends.

FIG. 6 is a flow diagram of method 600 where the collection is refined using the suggestion widget 126 (i.e., an implementation of step 506 in FIG. 5). Upon execution, the method 600 starts at step 602 and proceeds through to step 616.

At step 603, the method 600 identifies an item that has been selected. At step 604, as a user positions a pointer over a cell (i.e., an intersection of a column and a item listing within the suggested collection display pane) in the suggested collection, a thumb appears along the bottom of the cell. By selecting the thumb, the suggestion widget displays a suggested list of items related to the cell, as described below and further with respect to FIG. 7.

The method 600 proceeds to step 606 where the metadata associated with the cell is identified for use in selecting additional items for the collection. The method 600 then proceeds to step 608 where the thumb is expanded to a size determined by the user via dragging the pointer to expand the list produced under the thumb. At step 610, items from the library that contain the same metadata as contained in the selected cell are displayed in a list of predefined length. The user may interact with the list to expand the length, i.e., by dragging a corner of the list or scrolling down the list. When an item is found that is to be added to the collection, the user merely "clicks on" the item in the list. Multiple items may be selected at once by clicking and dragging the mouse pointer, holding a control key while selecting multiple items, or using other commands to facilitate selection of multiple items. Step 610 may be repeated until the user is satisfied with the selection of items to be added. The method 600 proceeds to step 614 and the selected items are added to the current collection 128. The method 600 then proceeds to step 616 and ends.

Figure 7:
FIG. 7 illustrates a display screen of an exemplary embodiment of the suggestion widget, according to one or more embodiments.

FIG. 7 is a screen display 700 illustrating an exemplary embodiment of the suggested collection display pane as modified when the suggestion widget 126 is executed in accordance with the method 600 of FIG. 6. When a user "hovers" over a cell (e.g., the cell at the intersection of item 712 and genre column 228), the widget 126 may be executed. In other embodiments, the widget 126 is executed when hovering over the cell as well as selecting a command or control key. In still further embodiments, the widget may only be executed when the widget 126 is selected for execution from a menu. In still other embodiments, hovering over a cell with a pointer 702 may cause a thumb to appear (e.g., thumb 702) that, when selected (clicked upon), the widget 126 is executed.

Upon execution, the widget causes information to be expanded to form an item list 706 of predefined length (e.g., three items). The list contains a plurality of randomly selected library items having the metadata of the thumb, e.g., "alternative." If the user desires to include an item from the list in their collection, they merely "click on" the item. If the user desires to view additional items having the same metadata, the user moves the pointer 704 to the edge of the list, then clicks and drags the edge to expand the list, e.g. from three items (list 706) to five items (list 708), and finally, to seven items (list 710), or more. Items in the expanded list may be individually selected for the collection or selected as a group. In one embodiment, the lists are "sticky" in that they remain expanded once the desired size is created. As such, the user may easily select the desired items individually or as a group. The selected items are added to the suggested collection.

Figure 8:
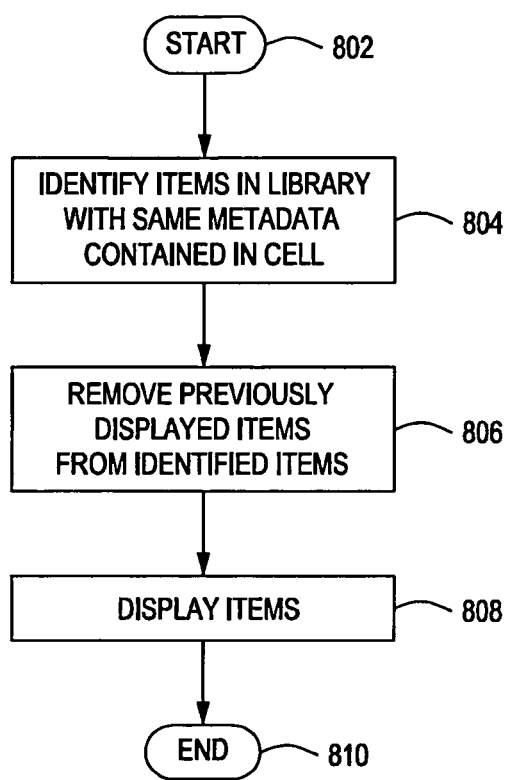
FIG. 8 is a flow diagram of a method of selecting and displaying items from the library, according to one or more embodiments.

FIG. 8 is a flow diagram of a method 800 of selecting and displaying alternative items from the library for use in refining the current collection 128. This method 800 is called within any of the refining methods to ensure that the suggested alternative items are not duplicative of items currently contained in the suggested collection. The method 800 starts at step 802 and proceeds through to step 810.

At step 804, all items in the library with the same metadata as contained in the selected cell are identified. The method 800 then proceeds to step 806 where the identified alternative items are compared to the currently displayed items. All items, which have already been suggested to the user, are removed from the identified alternative items. The method 800 then proceeds to step 808 wherein a number of previously undisplayed items are displayed. The method 800 proceeds to step 810 and ends.

Figure 9:
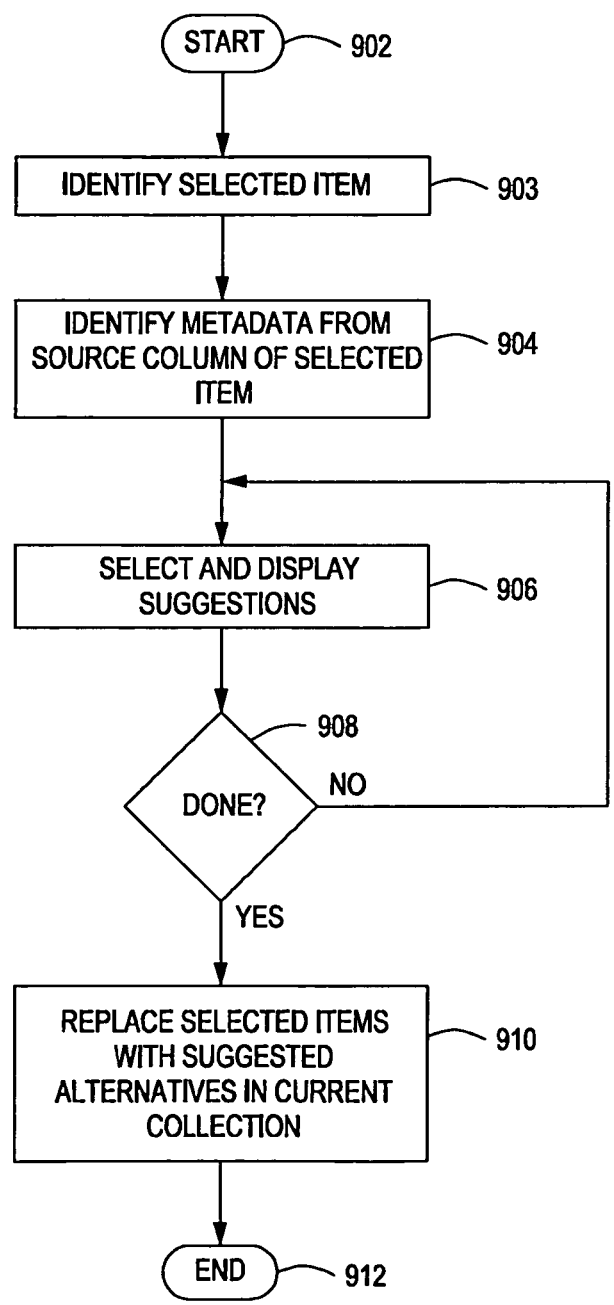
FIG. 9 is a flow diagram of a method of replacing items in the collection, according to one or more embodiments.

FIG. 9 is a flow diagram of a method 900 of replacing items in the current collection 128 (i.e., one embodiment of an implementation of step 510 of FIG. 5). The method 900 starts at step 902 when a user selects to use the replacement selector 136 and proceeds to step 912.

At step 903, the method 900 identifies at least one item that has been selected for replacement (i.e., items targeted for replacement) via control or command selection, point and drag, or the like. At step 904, metadata is extracted from the "Source" column of the selected cells in the current collection to identify the source constraint that defined the original selection of the selected items, e.g., some rock. The method 900 then proceeds to step 906, where alternate items that fulfill the same source constraint are randomly selected from the library and displayed using method 800 above to avoid displaying items that were previously displayed. The list of alternate items contains the same number of items as the number of items in the current collection that are targeted for replacement. If the user desires to include the items from the list in the collection, they merely "click on" the items. If the user desires to view additional lists of items that have the same metadata to fulfill the source constraint, the user may use the right and left arrow keys to display lists of other alternatives as overlapping sets of items. Step 906 may be repeated until the user is satisfied with the replacement selection at which time the method 900 proceeds to step 910 where the selected items in the current collection 128 are replaced in-place with the refinement selections. The method 900 then proceeds to step 912 and ends.

FIG. 10 is a screen display 1000 illustrating an exemplary embodiment of selecting items for replacement within the collection pane 208 of FIG. 2 in accordance with the method 900 of FIG. 9. Four items 1002 were selected from the current collection 1004. The text in the Source column 1006 shows that these items satisfied the user specification "some rock". If the user desires to view items to replace those that are selected, the user depresses the right or left arrow key (or some other indicia of replacement). In response, a list of items 1008 associated with the metadata "Rock" are displayed as alternatives. If the user desires to include the list in their collection, they merely "click on" the list. If the user seeks more alternatives, the user may continue to use the right or left arrow keys to see additional screens of four songs (items 1010). The lists are "sticky" in that they will remain displayed until the user selects a replacement or closes the replacement lists by depressing a particular key (e.g., a key directed opposite to the key that opened the list). As such, the user may easily select the desired replacement items.

Figure 11:
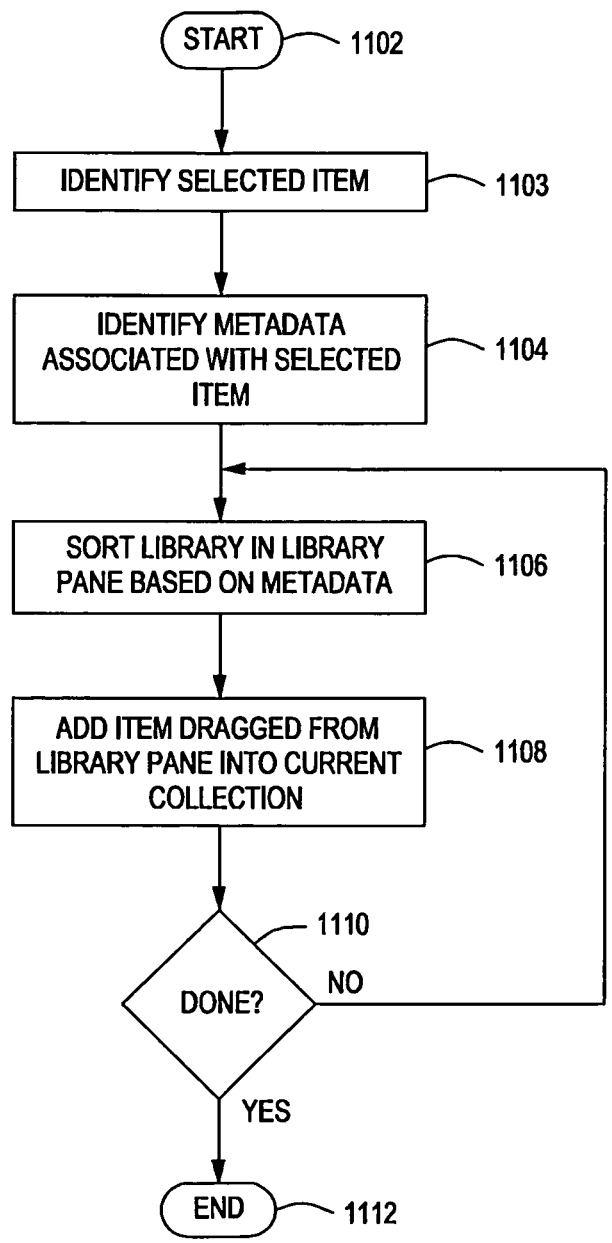
FIG. 11 is a flow diagram of a method of browsing the library to select items to add to the current collection, according to one or more embodiments.

FIG. 11 is a flow diagram of method 1100 of browsing the library for selection additional items to be added to the current collection 128 (i.e., one embodiment of an implementation of step 514 of FIG. 5). The method 1100 begins at step 1102 and proceeds through to step 1112.

At step 1103, the method 1100 identifies an item that has been selected within the suggested collection pane 208 of FIG. 2. At step 1104, when the user hovers the pointer over a cell defining metadata, the method identifies the metadata contained in the selected cell. The method 1100 then proceeds to step 1106, where the library displayed in the library pane 204 is sorted based on the identified metadata and the selected item in the collection pane 208 is highlighted and centered in the library pane 204. The user may browse through the library by scrolling up and down through the items in the library pane 204 that surround the selected item. If the user desires, the library may be re-sorted by moving the mouse pointer over a column heading and "click on" the heading. This will cause the library to sort based on that heading. When the user finds an item they would like to add to the current collection, they move the mouse pointer over the item, click the mouse button and drag the mouse over to the current collection pane 208. The method 1100 then proceeds to step 1110 where items that are dragged from the library pane 204 and dropped into the current collection pane 208 are added to the collection 128. Step 1110 may be repeated until the user has added all desired items to the current collection 128 at which time method 1100 proceeds to step 1112 and ends.

FIG. 12 is a screen display 1200 illustrating an exemplary embodiment of browsing the library for additions as performed during execution of method 1100 of FIG. 11. The user has identified a song by selecting the artist cell 1204 containing, "The Postal Service". The library is sorted by artist with the selected song 1202 "Give Up" centered and highlighted in the library pane 204. Had the user selected the same song on the genre cell 1206 containing "Alternative", the library would have been sorted by genre with the song 1202 "Give Up" centered and highlighted in the library pane 204.

Figure 13:
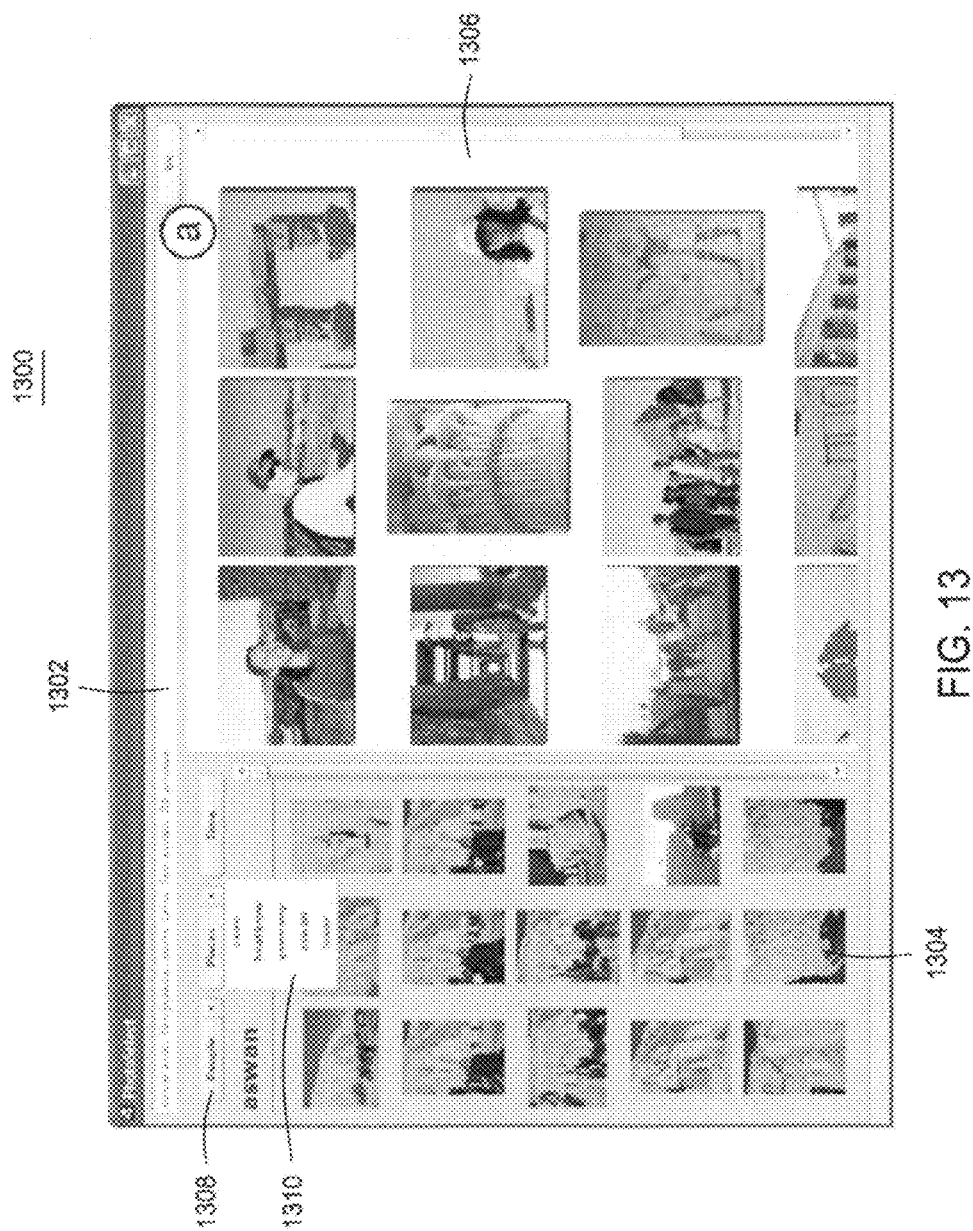
FIG. 13 illustrates a display screen containing a display of two-dimensional items on the two-paned user interface with an auto-complete text box, according to one or more embodiments.

FIG. 13 is a screen display illustrating a user interface according to one or more embodiments where two-dimensional items are displayed in a grid rather than a list. In some embodiments, the methods described herein could be applied to one-dimensional items, two-dimensional items, or a combination thereof. In an embodiment for organizing collections of two-dimensional items, the user interface 1300 comprises an auto-complete text box 1302 and two panes, one is a library display pane 1304 and the other is a current suggested collection display pane 1306. The user interface 1300 also contains three buttons 1308 which can be used for sorting the collection based on metadata associated with the items.

In one specific embodiment, where the library items are photographs, the library can be sorted by people, places or time using the selectable buttons 1308 on the display. The people and places buttons 1308 contain dropdown menus 1310 to enable searching and/or sorting based on specific people or places contained in the item metadata. The auto-complete text box 1302 accepts metadata such as people, places, and the number of photographs desired in the collection, as well as phrases such as "some landscapes" or "a few group shots" and/or the like depending upon the metadata associated with the items in the library. Thus in a similar manner as performed with respect to one dimensional items compiled into a list, this embodiment functions to create collections of two-dimensional items, e.g., photographs, videos clips, and the like.

The methods above for processing queries, generating a suggested collection, then facilitating refinement of the collection operate substantially similarly when organizing collections of two-dimensional items. One significant difference is that the items are organized in a grid and may be grouped using metadata defining the content of the item. The suggestion widget operates differently with respect to two-dimensional objects in that each item may comprise tabs that facilitate refining the collection.

Figure 14:
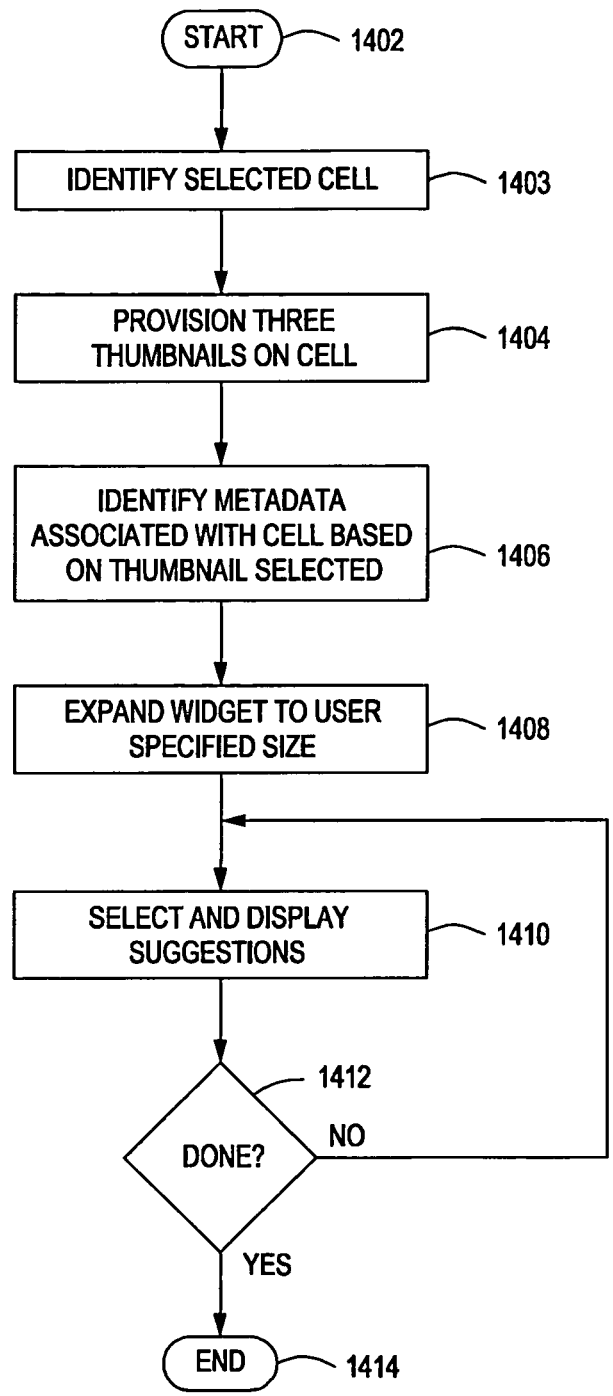
FIG. 14 is a flow diagram of a suggestion widget for refining a collection of two-dimensional items, according to one or more embodiments.

FIG. 14 depicts a flow diagram of method 1400 of adding items to the current collection 128 using a suggestion widget 126 in collections of two-dimensional items according to one or more embodiments. The method 1400 starts as step 1402 and proceeds through to step 1414.

At step 1403, the method 1400 identifies an item residing in a particular two-dimensional cell with the grid of the collection pane 1306. At step 1404, as a user positions a pointer over a cell in the suggested collection, three thumbs are provisioned along the right side of the cell. In other embodiments, the thumbs may appear upon using a command or control key, or some other indicia that he user desires to execute the suggestion widget. In one specific embodiment, where the library is a photo library, one thumb is provisioned for adding photographs of the same people within the photograph in the cell, another is provisioned for adding photographs of the same place depicted in the photograph in the cell, and the third is provisioned for adding items from the same time period as the photograph in the cell was taken. In other embodiments different metadata may be used to define the thumbs using less or more thumbs.

Upon the user selecting a thumb, the method 1400 proceeds to step 1406, where the metadata associated with the selected thumb is identified for use in selecting additional items for the collection. The method 1400 proceeds to step 1408 where the user "clicks on" one of the thumbs and drags it to expand the widget. As the user "drags" the thumb, items that contain the same metadata as contained in the selected cell are selected from the library and displayed in the collection proximate the selected cell. As the user further drags the thumb, additional previously undisplayed items are selected from the library and displayed in the collection. In step 1410, as the alternate items are displayed to the user, the method uses the method 800 as described above to avoid displaying duplicate items. Any of the alternate items may be selected via point and click to add the item to the collection. Step 1410 may be repeated until the user is satisfied with the selection of items that have been added to the collection. The method 1400 proceeds to step 1414 and ends.

Figure 15A:
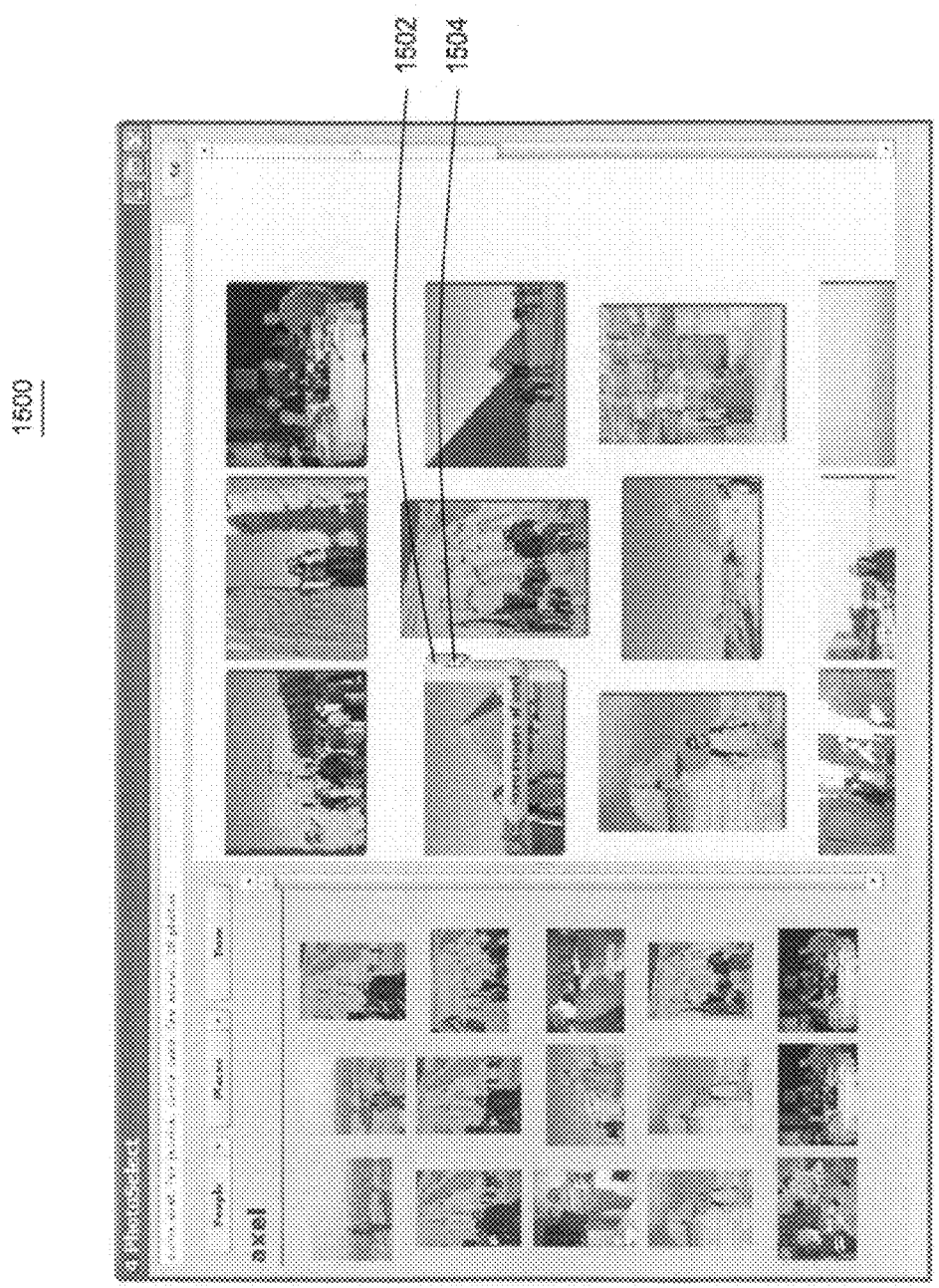
Figure 15B:
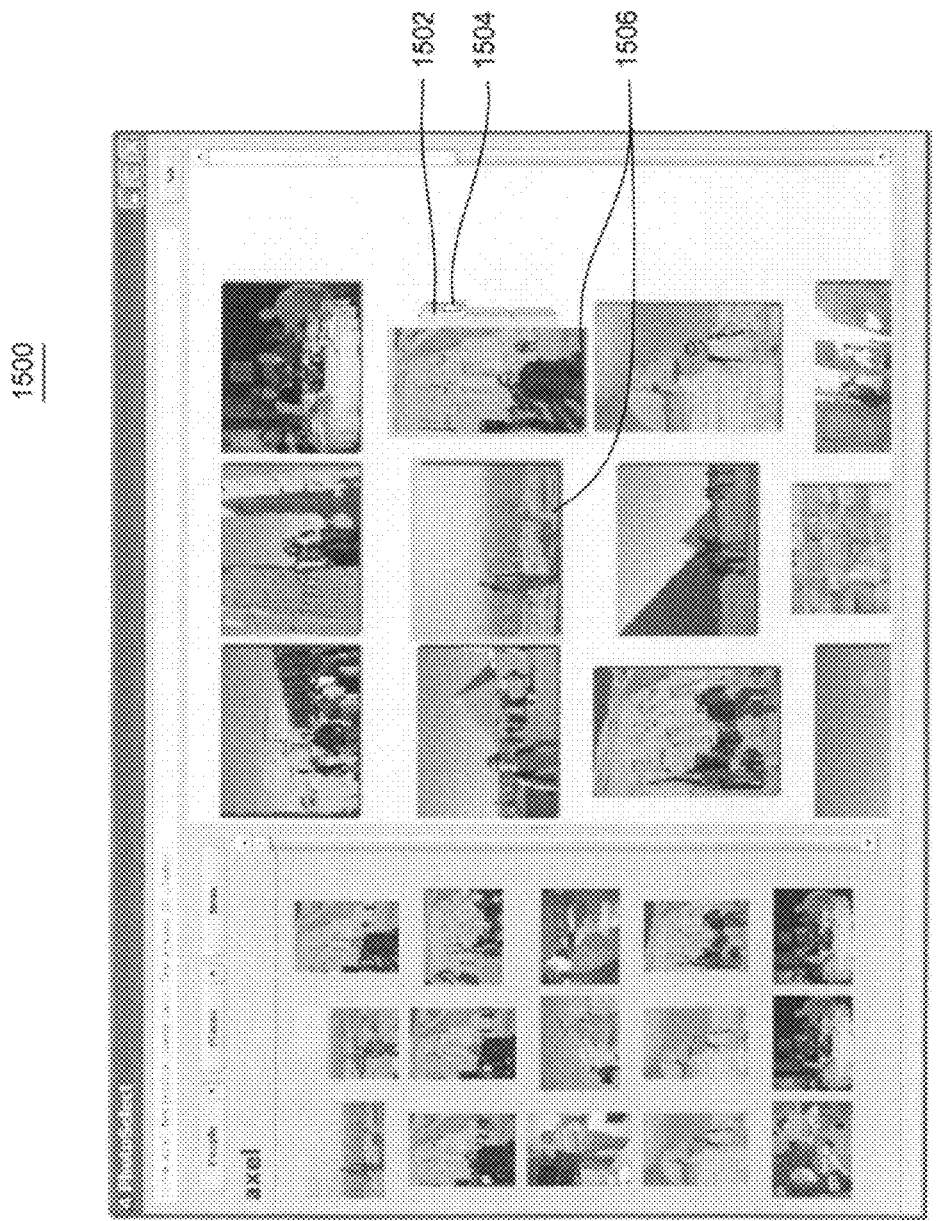

FIGS. 15a, 15b and 15c is a screen display 1500 illustrating three exemplary embodiments of the suggestion widget 126 for use with a photo library as implemented using the method 1400 of FIG. 14. In FIG. 15a, the selected item is a photograph of "Axel in Aswan taken Dec. 30, 2008". The user or the photographer typically adds the metadata defining the photograph as the photograph is initially added to the library. In some cases, such as the date or geographic coordinates, the camera may automatically attach metadata to the photograph. The user may add more photographs of the same people to the collection by pointing to the top thumb 1502 with a mouse pointer 1504 and "clicking and dragging" the thumb 1502. As shown in FIG. 15b, the widget expands the cell near the thumb to show a plurality of alternate photographs 1506 having the metadata "Axel". The thumb 1502 represents other photographs with metadata "Axel". If the user desires to include the item, they merely "click on" the item(s). If the user desires to view additional items having the same metadata "Axel", they may use the right or left arrow keys to cycle through alternate photographs.

Similarly, additional photographs can be added having the metadata associated with the same place as the photograph in the selected cell as shown in FIG. 15c. The suggestion widget causes the cell to expand containing the metadata "Aswan" by pointing to the middle thumb 1508 with the mouse pointer 1504. By "clicking and dragging" the thumb 1508, the widget expands to show a plurality of alternate photographs having the metadata "Aswan". If the user desires to include the item, they merely "click on" the item(s). If the user desires to view additional items having the same metadata "Aswan", they may use the right or left arrow keys to cycle through alternate photographs.

Finally, additional photographs can be added having the metadata associated with the same time period as the selected photo. The suggestion widget causes the cell containing the metadata "Dec. 30, 2008" to expand by pointing to the bottom thumb 1510 with the mouse pointer 1504. By "clicking and dragging" the thumb 1510, the widget causes the cell to expand to show a plurality of alternate photographs having the metadata "Dec. 30, 2008". If the user desires to include the item in the collection, they merely "click on" the item(s). If the user desires to view additional items from the same time period, they may use the right or left arrow keys to cycle through alternate photographs.

Example Computer System

Various embodiments of a system and method for creating collections with automatic suggestions, as described herein, may be executed on one or more computer systems, which may interact with various other devices. One such computer system is computer system 1600 illustrated by FIG. 16, which may in various embodiments implement any of the elements or functionality illustrated in FIGS. 1-15. In various embodiments, computer system 1600 may be configured to implement the computer 100 described above. While the illustrated system demonstrates computer system 1600 implementing the collection creation software 116, computer system 1600 may be used to implement any other system, device, element, functionality or method of the above-described embodiments. In the illustrated embodiments, computer system 1600 may be configured to implement the collection creation software 116 as processor-executable executable program instructions 1622 (e.g., program instructions executable by processor(s) 1610 a-n) in various embodiments.

In the illustrated embodiment, computer system 1600 includes one or more processors 1610 a-n coupled to a system memory 1620 via an input/output (I/O) interface 1630. Computer system 1600 further includes a network interface 1640 coupled to I/O interface 1630, and one or more input/output devices 1650, such as cursor control device 1660, keyboard 1670, and display(s) 1680. In various embodiments, any of components 1660 or 1670 may be utilized by the collection creation software 116 to receive user input. In various embodiments, a user interface may be generated and displayed on display 1680. In some cases, it is contemplated that embodiments may be implemented using a single instance of computer system 1600, while in other embodiments multiple such systems, or multiple nodes making up computer system 1600, may be configured to host different portions or instances of various embodiments. For example, in one embodiment some elements may be implemented via one or more nodes of computer system 1600 that are distinct from those nodes implementing other elements. In another example, multiple nodes may implement computer system 1600 in a distributed manner.

In different embodiments, computer system 1600 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, application server, storage device, or in general any type of computing or electronic device wherein collections of items need to be organized.

In various embodiments, computer system 1600 may be a uniprocessor system including one processor 1610, or a multiprocessor system including several processors 1640 a-n (e.g., two, four, eight, or another suitable number). Processors 1610 may be any suitable processor capable of executing instructions. For example, in various embodiments processors 1610 may be general-purpose or embedded processors implementing any of a variety of instruction set architectures (ISAs), such as the x96, PowerPC, SPARC, or MIPS ISAs, or any other suitable ISA. In multiprocessor systems, each of processors 1610 may commonly, but not necessarily, implement the same ISA.

System memory 1620 may be configured to store program instructions 1622 and/or data 1632 accessible by processor 1610. In one specific embodiment, memory 1620 may star suggested collections 132 as a portion of data 1632. In various embodiments, system memory 1620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 1620. In other embodiments, program instructions 1622 and/or data 1632 may be received, sent or stored upon different types of computer-accessible media or on similar media separate from system memory 1620 or computer system 1600.

In one embodiment, I/O interface 1630 may be configured to coordinate I/O traffic between processor 1610, system memory 1620, and any peripheral devices in the device, including network interface 1640 or other peripheral interfaces, such as input/output devices 1650, In some embodiments, I/O interface 1630 may perform any necessary protocol, timing or other data transformations to convert data signals from one components (e.g., system memory 1620) into a format suitable for use by another component (e.g., processor 1610). In some embodiments, I/O interface 1630 may include support for devices attached through various types of peripheral buses, such as a variant of the Peripheral Component Interconnect (PCI) bus standard or the Universal Serial Bus (USB) standard, for example. In some embodiments, the function of I/O interface 1630 may be split into two or more separate components, such as a north bridge and a south bridge, for example. Also, in some embodiments some or all of the functionality of I/O interface 1630, such as an interface to system memory 1620, may be incorporated directly into processor 1610.

Network interface 1640 may be configured to allow data to be exchanged between computer system 1600 and other devices attached to a network (e.g., network 1640), such as one or more external systems or between nodes of computer system 1600. In various embodiments, network 1640 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1650 may, in some embodiments, include one or more display terminals, keyboards, keypads, touchpads, scanning devices, voice or optical recognition devices, or any other devices suitable for entering or accessing data by one or more computer systems 1600. Multiple input/output devices 1650 may be present in computer system 1600 or may be distributed on various nodes of computer system 1600. In some embodiments, similar input/output devices may be separate from computer system 1600 and may interact with one or more nodes of computer system 1600 through a wired or wireless connection, such as over network interface 1640.

In some embodiments, the illustrated computer system may implement any of the methods described above, such as the methods illustrated by the flowcharts of FIGS. 3-6, FIGS. 8-9, FIG. 11 and FIG. 14. In other embodiments, different elements and data may be included.

Those skilled in the art will appreciate that computer system 1600 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 1600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1600 may be transmitted to computer system 1600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
   receiving a user specification containing at least one unquantified constraint defining particular items contained in a library, where the library comprises a plurality of items and metadata associated with each item in the plurality of items;
   parsing and translating the at least one unquantified constraint into at least one quantified constraint to define at least one item of the plurality of items in the library, wherein translating comprises converting the unquantified constraint into a proportion, and further translating the proportion into a specific quantity based on a total quantity identified in the user specification;

creating a suggested collection comprising at least one suggested item selected from the library having metadata conforming to at least one quantified constraint; and refining the suggested collection to form a final suggested collection.

2. The method of claim 1, further comprising partitioning the plurality of items in the library into at least one suggested item and at least one excluded item.

3. The method of claim 1, further comprising simultaneously displaying the plurality of items in the library within a first pane of a display and the suggested collection in a second pane of the display.

4. The method of claim 3 further comprising displaying metadata associated with each item in the respective first pane or second pane.

5. The method of claim 1, further comprising identifying within the at least one unquantified constraint a complex overlapping constraint and communicating the complex overlapping constraint to a constraint solver.

6. The method of claim 1, wherein creating the suggested collection comprises selecting items from the plurality of items until all quantified constraints are met.

7. The method of claim 1, wherein refining the suggested collection comprises performing at least one of:

(1) providing at least one suggested item from the plurality of items in the library in accordance with a user-provided item example;

(2) selecting a specific item for in-place replacement with another item from the at least one suggested item from the plurality of items in the library; or (3) browsing the library for additional items to be added to the suggested collection.

8. The method of claim 7, wherein the providing step further comprises suggesting additional items from the library having the same metadata as the user-provided item example selected from the suggested collection.

9. The method of claim 7, wherein specific item contains the same metadata as the at least one suggested item selected in the suggested collection.

10. The method of claim 7 wherein the at least one suggested item is selected from a subset of the plurality of items in the library which have not previously been suggested.

11. The method of claim 1 wherein the items are at least one of one-dimensional or two-dimensional.

12. A computer readable medium for storing instructions that, when executed by a computer system, cause the computer system to perform:

receiving a user specification containing at least one unquantified constraint defining particular items contained in a library, where the library comprises a plurality of items and metadata associated with each item in the plurality of items;

parsing and translating the at least one unquantified constraint into at least one quantified constraint to define at least one item of the plurality of items in the library, wherein translating comprises converting the unquantified constraint into a proportion, and further translating the proportion into a specific quantity based on a total quantity identified in the user specification;

creating a suggested collection comprising at least one suggested item selected from the library having metadata conforming to at least one quantified constraint; and refining the suggested collection to form a final suggested collection.

13. The computer readable medium of claim 12, wherein the refining step executed a collection refinement tools comprising at least one of:

a suggestion widget;

an item replacement selector; or a linked-view browsing module.

14. The computer readable medium of claim 13 that, when executed by a computing system, causes the computing system to further perform suggesting additional items based on metadata of suggested collection items.

15. The computer readable medium of claim 13 that, when executed by a computing system, causes the computing system to further perform in-place replacement or addition of items into the suggested collection.

16. Apparatus comprising:

a user interface for accepting user specifications containing at least one unquantified constraint, and a user specification translator for translating the at least one unquantified constraint into at least one quantified constraint, wherein the user specification translator converts the at least one unquantified constraint into a proportion, and further translates the proportion into a specific quantity based on a total quantity identified in the user specification, and wherein the at least one quantified constraint comprises information for selecting a subset of items from a library of items stored in memory to form a suggested collection; and refinement tools for selectively altering the subset of items in the suggested collection through addition or replacement of items.

17. The apparatus of claim 16, wherein the at least one quantified constraint identifies at least one item in the library based upon metadata associated with the at least one item.

18. The apparatus of claim 16, wherein the user interface provides a representation of the suggested collection for manipulation and refinement.

19. The apparatus of claim 16, wherein the refinement tools comprise the suggestion of items for addition or replacement based on metadata specified via the user interface.

20. The apparatus of claim 16 wherein the user interface comprises a library display pane and a suggested collection display pane.

* * * * *